Feb. 5, 1924.

H. J. SCHMICK

GEARING AND METHOD OF MAKING THE SAME

Filed Jan. 20, 1922  4 Sheets-Sheet 1

1,482,622

Inventor
Henry J. Schmick.
By Emery, Booth, Janney & Varney
his Attorneys

Feb. 5, 1924.

H. J. SCHMICK 1,482,622

GEARING AND METHOD OF MAKING THE SAME

Filed Jan. 20, 1922     4 Sheets-Sheet 2

Inventor
Henry J. Schmick.

By Emery, Booth, Janney & Varney
his Attorneys

Feb. 5, 1924.
1,482,622
H. J. SCHMICK
GEARING AND METHOD OF MAKING THE SAME
Filed Jan. 20, 1922  4 Sheets-Sheet 3

Inventor
Henry J. Schmick.
By Emery, Booth, Janney & Varney
his Attorneys

Feb. 5, 1924.

H. J. SCHMICK 1,482,622

GEARING AND METHOD OF MAKING THE SAME

Filed Jan. 20, 1922    4 Sheets-Sheet 4

Inventor
Henry J. Schmick.

By Emery, Booth, Janney & Varney
His Attorneys

Patented Feb. 5, 1924.

1,482,622

UNITED STATES PATENT OFFICE.

HENRY J. SCHMICK, OF WILLIAMSPORT, PENNSYLVANIA.

GEARING AND METHOD OF MAKING THE SAME.

Application filed January 20, 1922. Serial No. 530,631.

*To all whom it may concern:*

Be it known that HENRY J. SCHMICK, a citizen of the United States, residing at Williamsport, in the county of Lycoming, State of Pennsylvania, has invented an Improvement in Gearing and Methods of Making the Same, of which the following description, in connection with the accompanying drawings, is a specification, like characters on the drawings representing like parts.

This invention aims to improve the efficiency and utility of gearing, more especially gearing having twisted teeth, such as bevel, screw and worm gearing, and comprises both the gearing as a new article of manufacture and a novel method of producing gear teeth and screw threads.

This invention differs from and is an improvement upon gearing as heretofore produced in combining in one product both rolling and angularly sliding stepped movement to either hand relative to the direction of lead, thereby reversing and consolidating the effect of the right and left hand components of travel of twisted gearing as heretofore made so as to reduce and eliminate the loss of efficiency and power due to the angularity of the teeth.

Reference is made to my prior Patent No. 675,020, dated May 28, 1901, for an explanation of the operation of stepped, flat contact surfaces in a "radio-helical cam" from which one of the underlying principles of operation of the cam-like engaging means constituting the working faces of the present invention may be understood.

Further aims and advantages of the invention appear hereinafter in connection with the description of the forms of screw or worm gearing and method of producing the same selected for purposes of illustration.

In the drawings, Fig. 1 is a side view of a partly finished worm or screw gear embodying the invention;

Fig. 2 is a cross-section of the same on the line 2—2 in Fig. 1;

Figs. 3 to 8, inclusive, are a series of diagrams each simulating a development of a cylinder and having a series of cuts thereon illustrating independently and successively by diminishing intervals of different simultaneously occurring movements that result in the product shown in Fig. 1;

Figure 5:
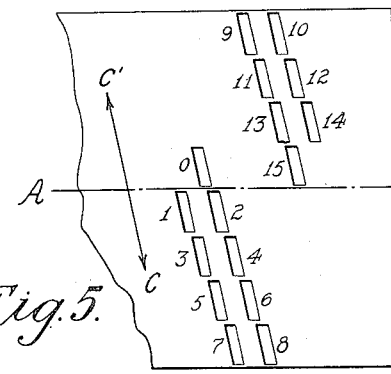
Figure 7:
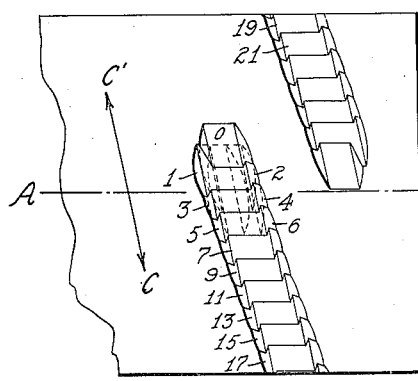
Figure 14:
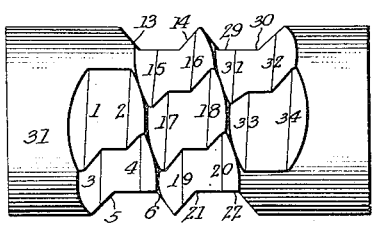
Figure 15:
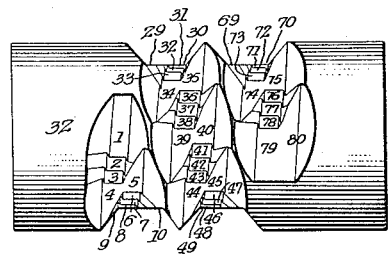
Figure 16:
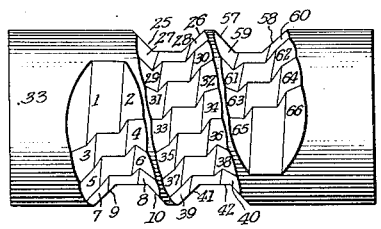
Figure 17:
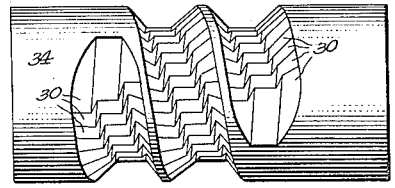
Figure 18:
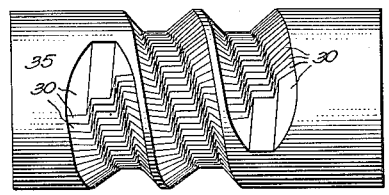

Figs. 14 and 15 are side views of specimen screw blanks illustrating for comparison the result of a very coarse angular and endwise spacing of the cuts and the effect of taking intermediate cuts spaced angularly but not endwise; and Figs. 16, 17 and 18 are side views of specimen screw blanks cut by the method illustrated in Figs. 5 and 7, showing the effect of different angular and lateral spacings of the cuts, the successive examples having the angular and lateral spacing diminished by one-half.

Figure 1:
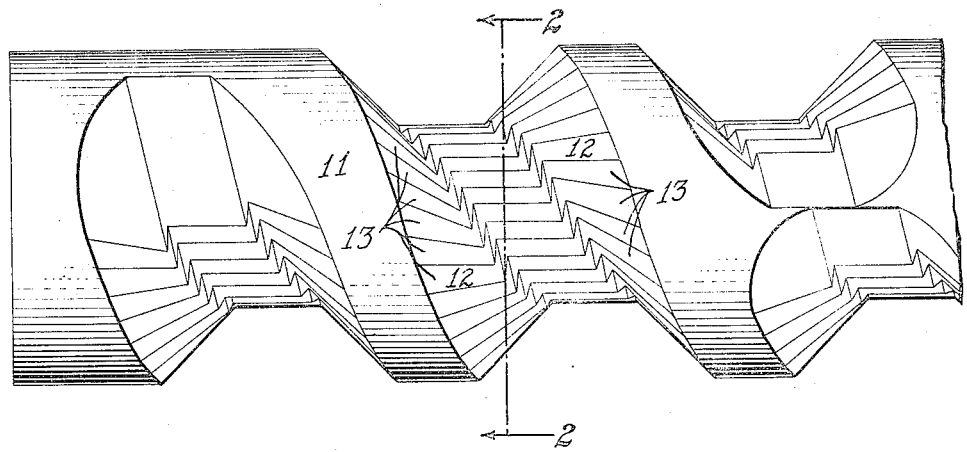
Figure 2:
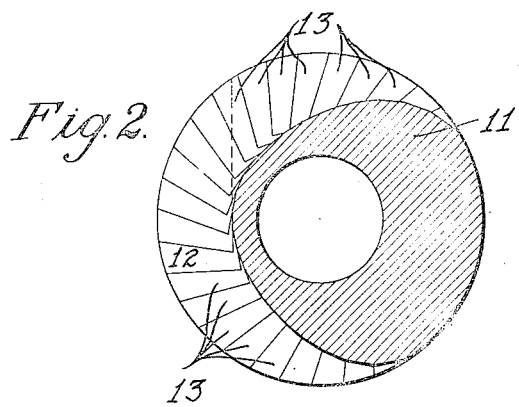

The screw 11 embodying my invention, which is illustrated in Figs. 1 and 2 in a partly completed state, has working faces 12, that are composed of a series of narrow facets 13, reversed in angular direction on the two faces, formed by cutting a succession of grooves with straight bottoms and outwardly diverging slanting side walls crosswise of the axis of the screw, successive grooves being spaced circumferentially around the screw and lengthwise of the axis by rolling the screw at an angle to the normal to the axis of the cutter.

This action may be better understood by referring to the diagrams, Figs. 3 to 8, inclusive, each of which shows the development of a cylinder (shown in heavy dotted lines in Fig. 3) having its axis A—B horizontal and movable in a horizontal plane back and forth in the direction of the double arrows C—C', and also capable of adjustment in three directions or ways, first, angularly; second, endwise in the direction of B; and third, sidewise in the direction perpendicular to its axis as indicated by the arrows D. Assume that this cylinder is moved forward in the direction of the arrow C and under a cutter so as to make the cut 0 in Fig. 3, then back in the opposite direction C", and adjusted prior to taking a second cut by rolling it in the direction of the arrows D on a pair of imaginary wheels (which in the illustrative example are somewhat larger in diameter than the cylinder itself) until it has rotated through 45°. If it is again moved forward to engage the cutter in the direction of the arrow C the resulting cut will be made in the location indicated by the numeral 1 in Fig. 3. Upon again adjusting the angular position of the cylinder by rolling it as before and making another cut 2 it will be spaced relatively to the preceding cuts as indicated in the diagram Fig. 3. If the same cycle of operations be repeated, successive cuts 3, 4, 5, 6, 7 and 8 will be made occupying relative positions around the cylinder as shown in the development, Fig. 3, in the direction of a left hand thread.

Figure 4:
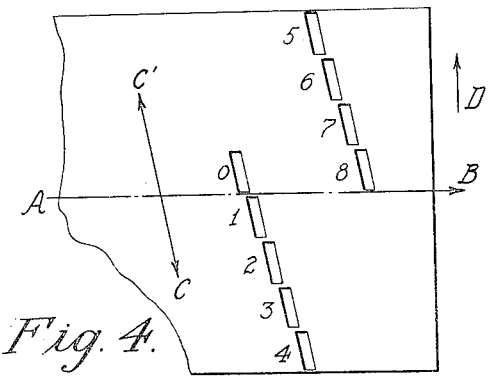

If, in addition to adjusting the cylinder angularly by rolling it as described above, it is also adjusted axially in the direction of B an amount greater than its relative movement toward A due to its rolling, and successive cuts are taken after making both the angular and axial adjustments these cuts will occupy relative positions as shown in Fig. 4, wherein the successive cuts are numbered 0, 1, 2, 3, 4, 5, 6, 7 and 8, and have the direction around the screw of a right hand thread, just the reverse of the result of rolling the blank.

Figure 3:
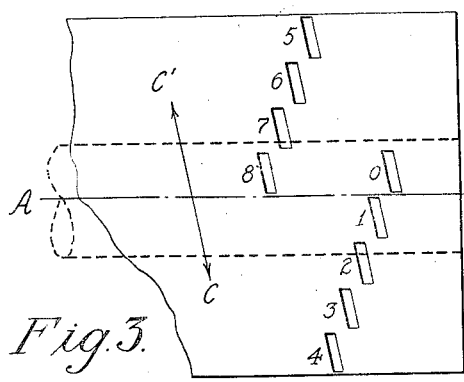

This effect is the resultant of the left hand component due to rolling the cylinder and the right hand component due to spacing it endwise of its axis, as is clear from an inspection of Fig. 5, wherein the cut numbered 1 was made following the cut 0 after adjusting the cylinder by rolling as described in connection with Fig. 3 and the cut numbered 2 was made following the cut 1 after adjusting the cylinder lengthwise toward B an amount somewhat greater than the component of endwise movement due to rolling it. The successive odd numbered cuts were each made after a rolling adjustment, and the intervening series of even numbered cuts were each made after an endwise adjustment of the cylinder.

Figure 6:
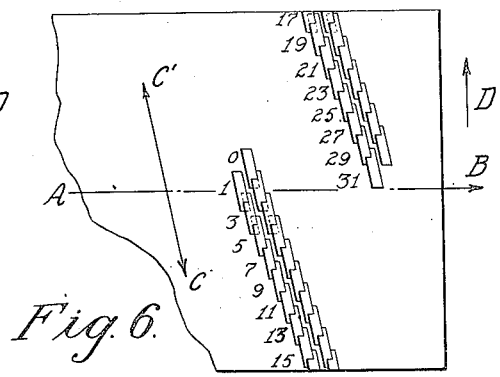

If the spacing circumferentially and axially be diminished by one half, the two series of odd and even numbered cuts approach one another and the cuts in each series overlap to form a continuous groove, as shown in Fig. 6. If this process of diminishing the spacing be carried far enough it is evident that the two series of cuts will nearly coincide, approximating a single groove winding around the cylinder in either a right hand or a left hand direction depending on the relative magnitude of the left hand component due to rolling the cylinder and the right hand component due to adjusting the cylinder endwise.

In Fig. 7, the individual cuts, instead of being straight walled as in Figs. 3, 4, 5 and 6, have slanting sides, and the width of the flat bottom and relative amounts of rolling movement and endwise movement are such as to cause successive cuts to overlap circumferentially and axially when the cuts are taken first after rolling and then after adjusting axially as described for Fig. 5.

Figure 8:
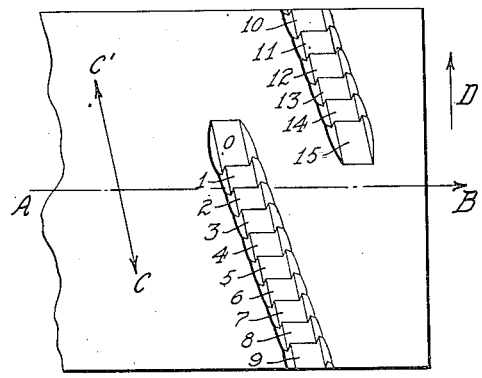

In Fig. 8 the successive cuts are taken after both a rolling and an axial adjustment of the cylinder, the same as shown in Fig. 4, except that the cuts have slanting sides in Fig. 8 instead of the straight sides of Fig. 4. The resulting groove has similar but not identical characteristics when both rolling and axial adjustment of the cylinder are made between successive cuts, as when they are made singly in alternation between cuts, as is indicated by a comparison of Figs. 7 and 8.

Figure 12:
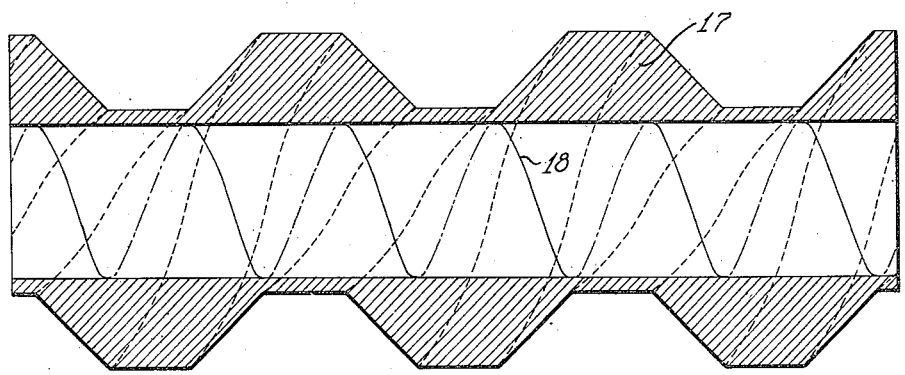
Fig. 12 is a cross-section of a finished gear produced by the process described in connection with Fig. 7.
Figure 13:
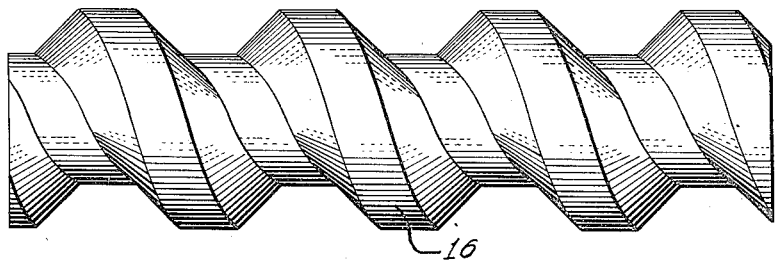
Fig. 13 is a side view of a finished gear produced by the process described in connection with Fig. 8.

See also Figs. 12 and 13, wherein the latter shows a gear 16 produced by the process illustrated in Fig. 8, and the former shows a similar gear 17 made by the process illustrated in Fig. 7. The dotted line 18 in Fig. 12 indicates the left hand direction of the thread due to rolling the blank.

Figure 11:
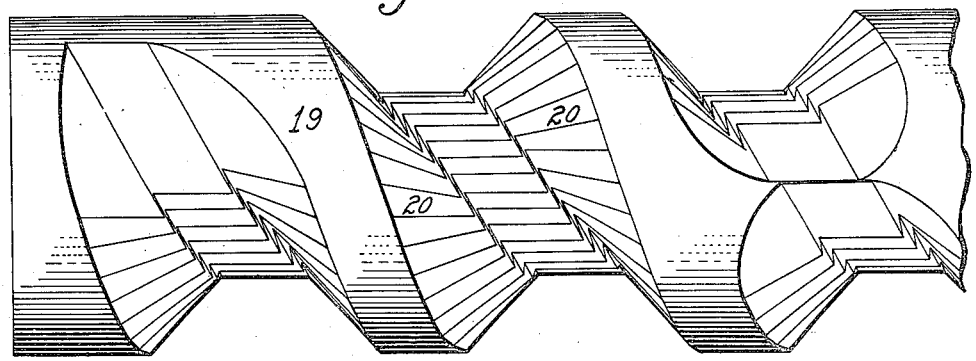
Fig. 11 is a view similar to Fig. 1 of a worm or screw gear having a greater angle of obliquity of the line of cut with reference to the axis of the gear.

The gear 19 shown in Fig. 11 has its working faces 20 formed by cuts taken at an angle approximately the same as the direction of their inner or base edges. The reversal of the angle of the facets on opposite sides of the groove thereby formed is even more marked than in the case of the gear shown in Fig. 1.

In the illustrative specimens shown in Figs. 14 to 18, inclusive, the direction of the angle made by the successive cuts is to the left, i. e., contrary to the direction of lead, as clearly shown by comparing Fig. 17, for example, with Fig. 1. This results in changing the direction of slope of the straight portions of the side walls or facets 30 with reference to the axis of the blank, which is advantageous for some purposes.

The specimen 31 shown in Fig. 14 is produced by a cycle of operations like that illustrated in Figs. 5 and 7, wherein the blank is alternately rolled and spaced between the successive cuts. The specimen 32 shown in Fig. 15 is produced by a cycle of operations wherein the blank is cut and rolled four times in succession (each rolling being one-fourth the angle of rolling in the production of the specimen 31 shown in Fig. 14) and after the fourth cut it is shifted laterally the same distance as in the production of the specimen 31. The successive cuts are numbered from 1 on in each of these Figs. 14 and 15.

The specimen 33 shown in Fig. 16 is produced by a similar cycle of operations to that followed in producing the specimen 31, excepting that there are twice as many cuts, and the amount of rolling and lateral shifting is one-half that used in producing specimen 31. Likewise the specimens 34 and 35 shown in Figs. 17 and 18, respectively, are produced similarly to specimen 33, the difference being that the number of cuts is doubled and the amount of rolling and lateral shifting halved in producing specimen 34 in comparison with those for specimen 33, and is four times and one quarter, respectively, in producing specimen 35 in comparison with the same cuts and movements in producing specimen 33. These specimens, 33, 34 and 35, exemplify the characteristic features of the invention found in the specimens shown in Figs. 1 and 11, and illustrate the fact that these characteristics are maintained as the number of cuts and fineness of the spacing are increased to the necessary degree to produce a sufficiently uniform surface for the product to have commercial utility.

Figure 9:
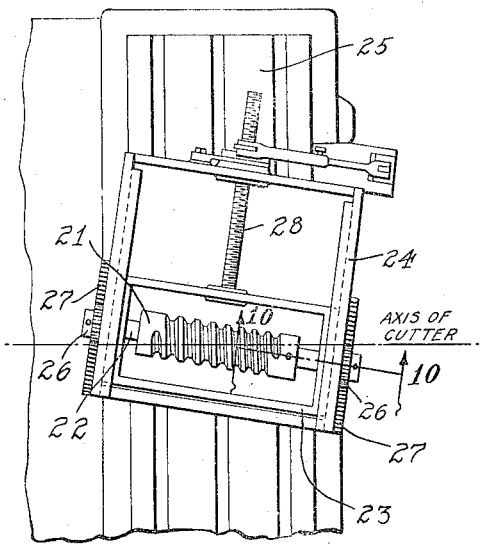
Fig. 9 is a plan view showing the relative position of the cutters and work arranged to cut a right hand screw.
Figure 10:
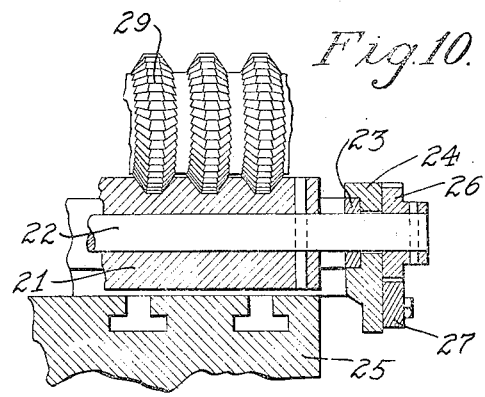
Fig. 10 is a vertical section of the same on the line 10—10 in Fig. 9, drawn to larger scale.

Figs. 9 and 10 illustrate suitable apparatus for producing screws by my improved method. The blank 21 is mounted to turn on an arbor 22 which has its ends journaled in a sliding frame 23 supported in a guide frame 24 on the table 25 of a suitable machine such as is described in my application filed December 31, 1921, Serial No. 526,327. The ends of the arbor 22 have gears 26 which roll on the racks 27 fixed to the guide frame 24. A screw 28 serves to adjust the sliding frame in the guide frame to rotate the arbor and blank. Lateral adjustment of the guide frame and blank may be secured by the usual cross feed screw with which the table is fitted. The blank is caused to move back and forth under the cutter 29 by reciprocating the table 25, thereby making the successive cuts.

Gears made in accordance with my improved method are characterized by the ease with which they turn under a heavy load and by the fact that their angle of lead is constant from top to bottom, i. e. the angle made by their side walls with respect to the parallel planes parallel to the direction of the axis and the direction of cut at any point is the same at all points of said cut, irrespective of the distance from the axis. Hence twisted gears and screws embodying the invention can be made to roll together like gears and move lengthwise relative to each other like screws.

The invention is not restricted to any particular forms and dimensions of screw, nor to the particular means for making screws shown and described.

I claim the following as my invention:

1. A twisted gear tooth having its side walls making a constant angle from top to bottom with reference to the axis of the gear other than the angle of lead.

2. A twisted gear tooth having its side walls making a constant angle of lead from top to bottom, said angle being greater or less than a right angle as desired irrespective of the amount and direction of lead.

3. A screw of the character described adapted to roll together with a screw of like angle of side wall of the same hand.

4. A screw of the character described adapted to roll and slide lengthwise in engagement with a mating screw of the same hand.

5. The method of producing twisted gears by successive cuts transverse to the axis comprising rolling the blank between cuts to displace it bodily in a direction at an angle to the direction of the cut.

6. The method of producing twisted gears by successive cuts transverse to the axis, comprising rolling the blank between cuts to displace it bodily sidewise and endwise in a direction at an angle to the direction of the cut and adjusting it endwise of the axis of the cutter in the direction opposite to its endwise movement due to rolling.

7. The method of producing twisted gears, by successive cuts transverse to the axis, comprising rolling the blank between cuts to displace it bodily sidewise and endwise in a direction at an angle to the direction of the cut and adjusting it endwise of the axis of the cutter in proportion to the amount of displacement due to its rolling movement.

8. The method of producing twisted gears of the character described by a series of overlapping cuts, comprising rolling the blank at a predetermined angle to the direction of cut to produce combined movement of rotation and translation and maintaining a predetermined ratio of rotation to movement of translation.

9. The method of producing twisted gears by simultaneously rolling the blank between successive cuts to move it bodily sidewise and endwise in a direction at an angle to the direction of the cut and spacing it axially to counteract the endwise movement due to rolling.

10. The method of producing twisted gears by alternately rolling the blank between successive cuts to move it bodily sidewise and endwise in a direction at an angle to the direction of the cut and adjusting it endwise of the axis of the cutter in the direction opposite to its endwise movement due to rolling.

11. The method of producing a twisted gear of the character described by intermittent combined rotation and translation simultaneously in two directions, substantially as described.

12. Twisted gearing of the character described comprising pairs of facets on their opposite working faces having reversed angular inclination and parallel direction with reference to a common line transverse to their axis of rotation.

13. The method of producing a series of twisted grooves on a blank having a surface of revolution by means of a series of cutters that comprises reciprocating said blank transversely of the cutters to make a series of parallel cuts in its periphery, said blank being mounted to rotate and move bodily at right angles to its axis between cuts for indexing and the axis of said blank being held at an obtuse angle to the direction of cut, whereby indexing movement rotates and shifts said blank axially with reference to said cutters and successive cuts are displaced axially and circumferentially to merge in a plurality of grooves having side walls formed in oppositely disposed corresponding facets symmetrical about a transverse line making the same angle with the axis of the blank as the angle of said blank with the direction of cut.

14. The method of producing a twisted groove on a blank having a surface of revolution by means of a cutter that comprises reciprocating said blank transversely of the cutter to make a cut in its periphery, said blank being mounted to rotate and move bodily at right angles to its axis between cuts for indexing and the axis of said blank being held at an obtuse angle to the direction of cut, whereby indexing movement rotates and shifts said blank axially with reference to said cutter and successive cuts are displaced axially and circumferentially to merge in a groove having side walls formed in oppositely disposed corresponding facets symmetrical about a transverse line making the same angle with the axis of the blank as the angle of said blank with the direction of cut and having a stepped relationship in the direction of lead.

15. Gearing comprising mating gears having twisted teeth with side walls characterized by oppositely inclined straight strips grouped in pairs and constituting working surfaces, the strips of each pair sloping one up and the other down the sides of the teeth on opposite sides of the axis and having a transverse direction of slope at an angle with the axis greater or less than a right angle, whereby in operation said gears will partly roll and partly slide in and out of engagement.

16. Gearing comprising mating gears having twisted teeth with side walls characterized by oppositely inclined straight strips angularly disposed in offset stepped relation and merging along non-intersecting lines forming warped surfaces about the axes of rotation thereof, said flat strips being grouped in pairs of cam-like engaging means each having a slope at an angle to the axis and lying in a plane intersecting the plane of its mate in a line at an angle to the axis greater or less than a right angle, whereby in operation said gearing will partly slide and partly roll in and out of engagement.

In testimony whereof, I have signed my name to this specification.

HENRY J. SCHMICK.